(12) United States Patent
Rhee (10) Patent No.: US 9,552,954 B2
(45) Date of Patent: Jan. 24, 2017

(54) WASTE FLUORESCENT LIGHT END-CUTTING APPARATUS

(71) Applicant: KYONGGI UNIVERSITY INDUSTRY & ACADEMIA COOPERATION FOUNDATION, Suwon-si, Gyeonggi-do (KR)

(72) Inventor: Seung-Whee Rhee, Yongin-si (KR)

(73) Assignee: KYONGGI UNIVERSITY INDUSTRY & ACADEMIA COOPERATION FOUNDATION, Suwon-si, Gyeonggi-do (KR)

( * ) Notice: Subject to any disclaimer, the term of this patent is extended or adjusted under 35 U.S.C. 154(b) by 124 days.

(21) Appl. No.: 14/399,978

(22) PCT Filed: May 9, 2013

(86) PCT No.: PCT/KR2013/004053
§ 371 (c)(1),
(2) Date: Nov. 10, 2014

(87) PCT Pub. No.: WO2013/169016
PCT Pub. Date: Nov. 14, 2013

(65) Prior Publication Data
US 2015/0122097 A1    May 7, 2015

(30) Foreign Application Priority Data
May 9, 2012  (KR) .................. 10-2012-0049180

(51) Int. Cl.
 C03B 33/095    (2006.01)
 B26D 3/16    (2006.01)
(Continued)

(52) U.S. Cl.
CPC . *H01J 9/52* (2013.01); *B26D 1/02* (2013.01); *B26D 3/16* (2013.01); *B26D 7/0683* (2013.01);
(Continued)

(58) Field of Classification Search
CPC .. Y10T 225/02; Y10T 225/16; Y10T 225/304; Y10T 83/283; Y10T 225/12; C03B 33/095; H01J 9/52; B03B 9/062; B26D 3/166; Y02W 30/828
(Continued)

(56) References Cited

U.S. PATENT DOCUMENTS 2,410,931 A * 11/1946 Eisler .................... C03B 33/095
                                                             225/93.5
2,675,648 A *  4/1954 Martin .................. C03B 33/095
                                                             225/93.5
(Continued)

FOREIGN PATENT DOCUMENTS

DE    4131974 A1 *  4/1993   ............ B03B 9/062
JP   2005-230660 A    9/2005
(Continued)

OTHER PUBLICATIONS

International Search Report for PCT/KR2013/004053 mailed Sep. 4, 2013 from Korean intellectual Property Office.

*Primary Examiner* — Laura M Lee
(74) *Attorney, Agent, or Firm* — Paratus Law Group, PLLC (57) ABSTRACT

The present invention relates to a waste fluorescent light end-cutting device. The waste fluorescent light end-cutting device includes a conveyor transferring a waste fluorescent light, a heating wire disposed on each of both sides of the conveyor, a cooling wire subsequently disposed on a rear side of the heating wire, and a suction duct disposed between the cooling wire and the heating wire. A base cap is
(Continued)

separated from the waste fluorescent light by using a temperature difference between the heating wire and the cooling wire.

2 Claims, 8 Drawing Sheets

(51) Int. Cl.
| | |
|---|---|
| *H01J 9/52* | (2006.01) |
| *B26F 3/12* | (2006.01) |
| *B26D 7/10* | (2006.01) |
| *B26D 7/18* | (2006.01) |
| *C03B 33/10* | (2006.01) |
| *B26D 1/02* | (2006.01) |
| *B26D 7/06* | (2006.01) |

(52) U.S. Cl.
CPC ............... *B26D 7/10* (2013.01); *B26D 7/1863* (2013.01); *B26F 3/12* (2013.01); *C03B 33/095* (2013.01); *C03B 33/105* (2013.01); *Y02W 30/828* (2015.05); *Y10T 83/283* (2015.04); *Y10T 225/304* (2015.04)

(58) Field of Classification Search
USPC ............. 225/2, 4, 93.5, 94; 83/171; 219/221
See application file for complete search history.

(56) References Cited

U.S. PATENT DOCUMENTS

| | | | | |
|---|---|---|---|---|
| 3,215,345 A | * | 11/1965 | Ferguson | ................ C03B 33/09 225/93.5 |
| 3,782,615 A | * | 1/1974 | Webster | ................... B26D 1/03 219/221 |
| 6,305,624 B1 | * | 10/2001 | Polman | ................... B03B 9/062 241/301 |
| 2014/0102270 A1 | * | 4/2014 | Teck | ........................ B26D 3/28 83/13 |
| 2014/0103022 A1 | * | 4/2014 | Teck | ........................ B26D 3/28 219/221 |
| 2015/0020659 A1 | * | 1/2015 | Hoshiba | ................ C03B 33/095 83/24 |

FOREIGN PATENT DOCUMENTS

| | | |
|---|---|---|
| JP | 2008-229499 A | 10/2008 |
| JP | 2011-050928 A | 3/2011 |
| KR | 10-0224384 B1 | 7/1999 |
| KR | 10-0919863 B1 | 10/2009 |
| KR | 10-0931621 B1 | 12/2009 |

* cited by examiner

WASTE FLUORESCENT LIGHT END-CUTTING APPARATUS

CROSS REFERENCE TO PRIOR APPLICATION

This application is a National Stage Patent Application of PCT International Patent Application No. PCT/KR2013/004053 (filed on May 9, 2013) under 35 U.S.C. §371, which claims priority to Korean Patent Application No. 10-2012-0049180 (filed on May 9, 2012) which are all hereby incorporated by reference in their entirety.

TECHNICAL FIELD

The present invention relates to a waste fluorescent light end-cutting device, and more particularly, to a waste fluorescent light end-cutting device that is capable of accurately cutting a base cap of a waste fluorescent light without generating fragments of glass and is capable of effectively recovering a fluorescent material.

BACKGROUND ART

End-cutting technologies relevant to waste fluorescent light treatment are technologies in which a glass tube and a nonferrous metal (aluminum) are mechanically or thermally treated to separate a base cap therefrom. Although such an end-cutting technology has high cutting efficiency and resource recovery rate, when the mechanical treatment is performed, a lot of fragments of glass may be generated, and it may be difficult to control mercury. Also, when the thermal treatment is performed, a large amount of mercury gas is evaporated due to its high use temperature, and thus there is high possibility of the mercury gas emission in air.

Meanwhile, a thermal treatment method of the above-described end-cutting technologies may be classified again into a gas burner end-cutting method and an electric heater end-cutting method.

First, the gas burner end-cutting method is a method in which a glass tube and a nonferrous metal are cut from each other by using flame of a burner, which is mainly being used in Europe. In this gas burner end-cutting method, although the flame has a very high temperature of about 2,000° C., the glass tube may be accurately cut and clearly separated. Thus, a glass material is less likely to be mixed with a fluorescent material to allow the fluorescent material to be easily recovered. However, the gas burner end-cutting method is extremely changed in cutting efficiency according to conditions in use such as a pressure of the burner and a gas amount. Also, the gas burner end-cutting method may not be applied to small or complicate fluorescent lights.

Next, the electric heater end-cutting method is a cutting method using a heating wire. In more detail, the electric heater end-cutting method is a method in which heat is primarily applied between a glass tube and a nonferrous metal by using the heating wire, and shock through a cooling temperature is secondarily applied to the heated portion by using a cooling wire. In this electric heater end-cutting method, since the glass portion is clearly separated, the glass may be less likely to be mixed with the fluorescent material to allow the fluorescent material to be easily recovered. However, there is high possibility of causing heating wire damage due to a structure in which the heating wire is directly in contact with the cutoff portion. As a result, the heating wire needs to be periodically replaced, and also the cutoff surface of the fluorescent light is deteriorated in quality.

Although there are a lot of end-cutting method-related prior arts such as Patent Registration No. 10-0224384 (Oct. 15, 1999), Patent Registration No. 10-0919863 (Oct. 5, 2009), Patent Registration No. 10-0931621 (Dec. 14, 2009), and Japan Patent Publication No. 2008-229499 (Oct. 2, 2008), since expensive mechanical devices are used in most of the prior arts, relatively much manufacturing and operating costs are required. Also, the devices are complicated to frequently cause mechanical defects, and thus a skilled worker is needed.

Therefore, this inventor of the present invention was concerned about the above-described various problems according to the related art to seek solutions so as to accurately cut the base cap of the waste fluorescent light and stably separate the fluorescent material existing in the fluorescent tube, thereby inventing the present invention.

DISCLOSURE OF THE INVENTION

Technical Problem

The present invention is suggested to solve the problems according to the related art. An object of the present invention is to provide a waste fluorescent light end-cutting device that is capable of accurately cutting a base cap of a waste fluorescent light at a low temperature without generating fragments of glass and is capable of safely effectively recovering and removing a fluorescent material existing in a fluorescent tube.

Technical Solution

To solve the above-described technical problems, the present invention provides a waste fluorescent light end-cutting device including: a conveyor transferring a waste fluorescent light; a heating wire disposed on each of both sides of the conveyor; a cooling wire subsequently disposed on a rear side of the heating wire; and a suction duct disposed between the cooling wire and the heating wire, wherein a base cap is separated from the waste fluorescent light by using a temperature difference between the heating wire and the cooling wire.

In this case, the waste fluorescent light end-cutting device may further include a cutting knife connected to the heating wire and disposed on each of both sides of the conveyor.

Also, the heating wire may be constituted by a preheating part and a heating part.

In the present invention, the temperature difference between the heating wire and the cooling wire may be below about 600° C.

Meanwhile, the waste fluorescent light end-cutting device may be loaded on transportation.

Advantageous Effects

According to the present invention, since the base cap is cut by using the thermal shock due to the temperature difference between the heating wire and the cooling wire, the base cap may be accurately separated without generating the fragments of glass.

Also, the waste fluorescent light end-cutting device may cut the waste fluorescent light through the indirect contact with the heating wire to prevent the heating wire from being damaged, thereby continuously being used and uniformly maintaining quality in the cutoff surface.

In addition, the waste fluorescent light end-cutting device may be easily manipulated due to its relatively simple structure and reduced in manufacturing, operating, and labor costs.

MODE FOR CARRYING OUT THE INVENTION

Preferred embodiments of the present invention will be described below in more detail with reference to the accompanying drawings, such that those skilled in the art can realizes the technical ideas of the inventive concept without difficulties. In the drawings, anything unnecessary for describing the present disclosure will be omitted for clarity, and like reference numerals refer to like elements throughout.

Figure 1:
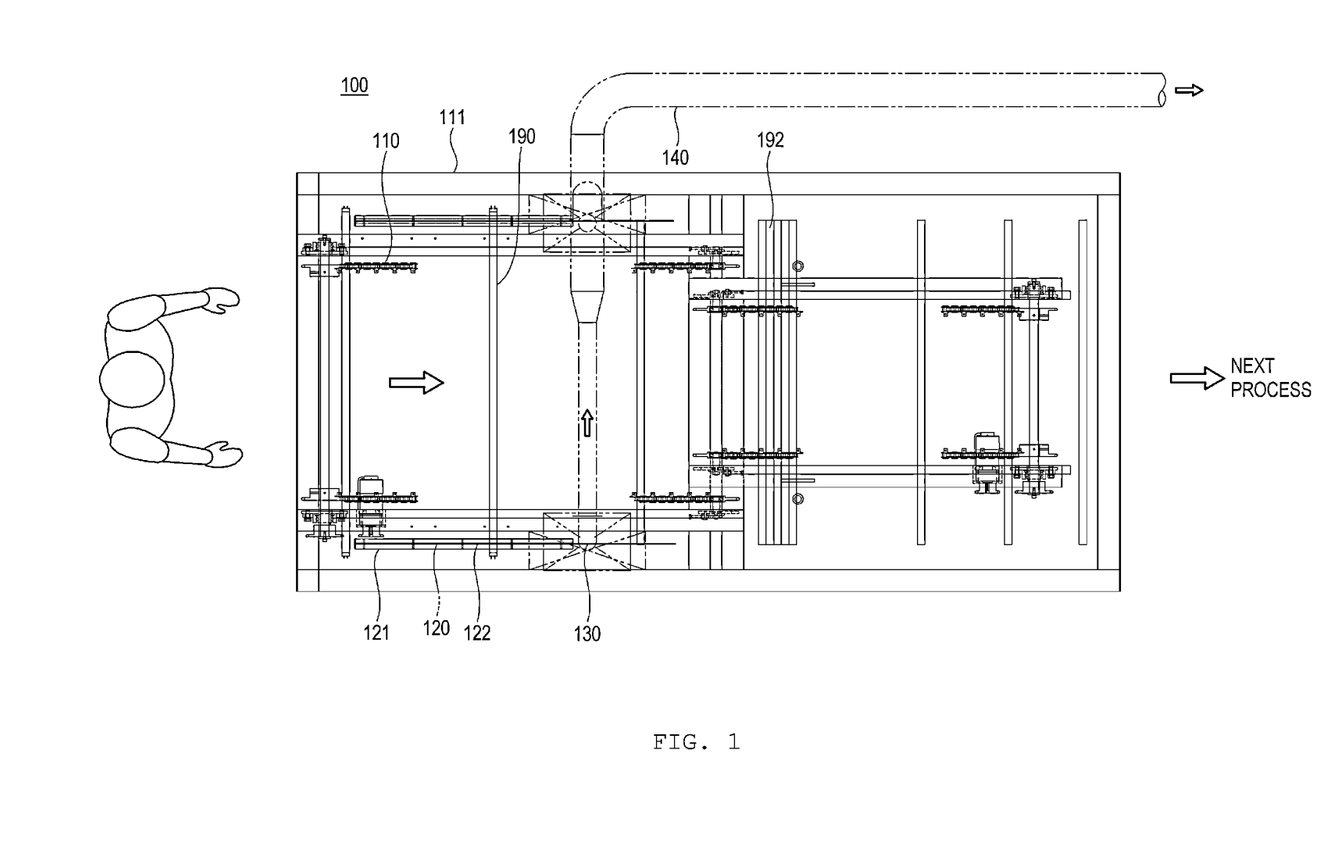
FIG. 1 is a plan view of an end-cutting device for a waste fluorescent light according to the present invention.
Figure 2:
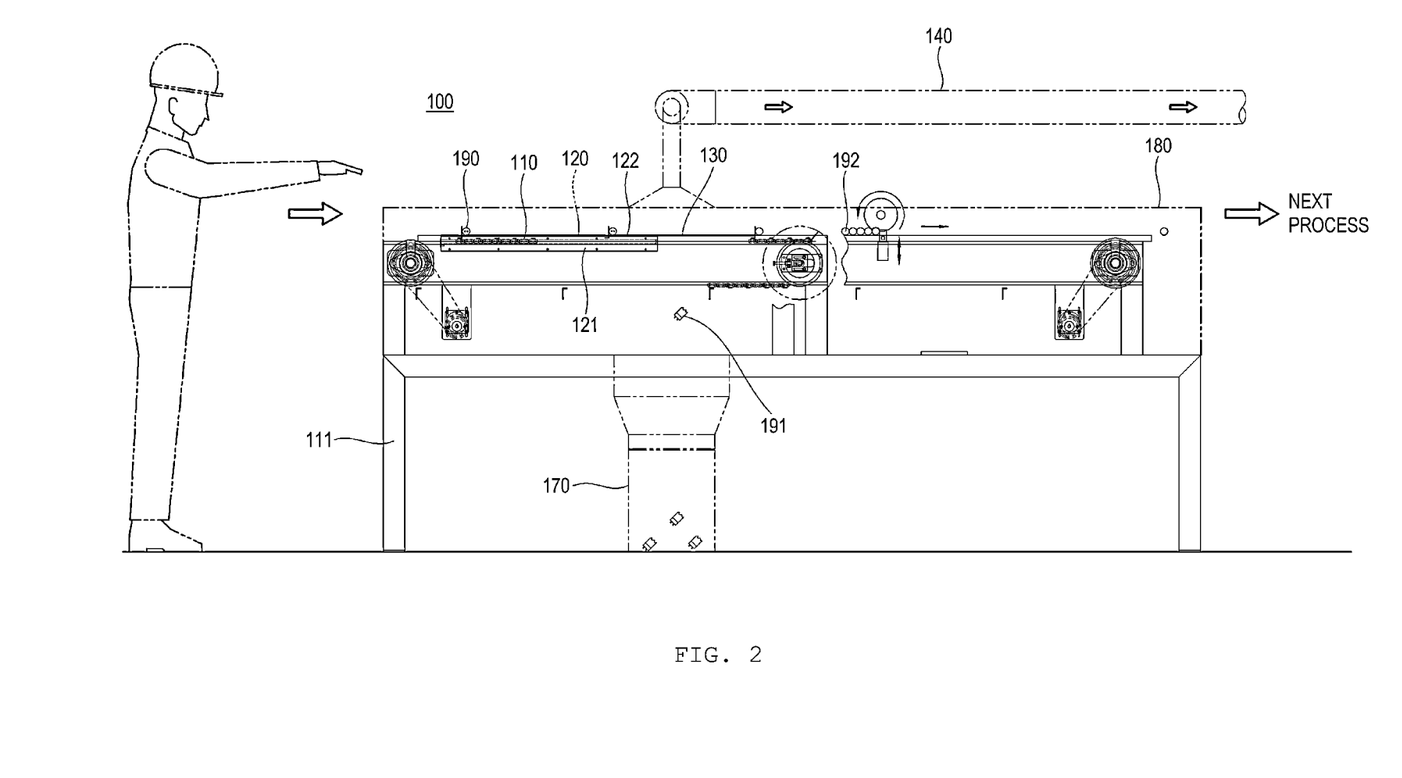
FIG. 2 is a side view of the end-cutting device for the waste fluorescent light according to the present invention.
Figure 3:
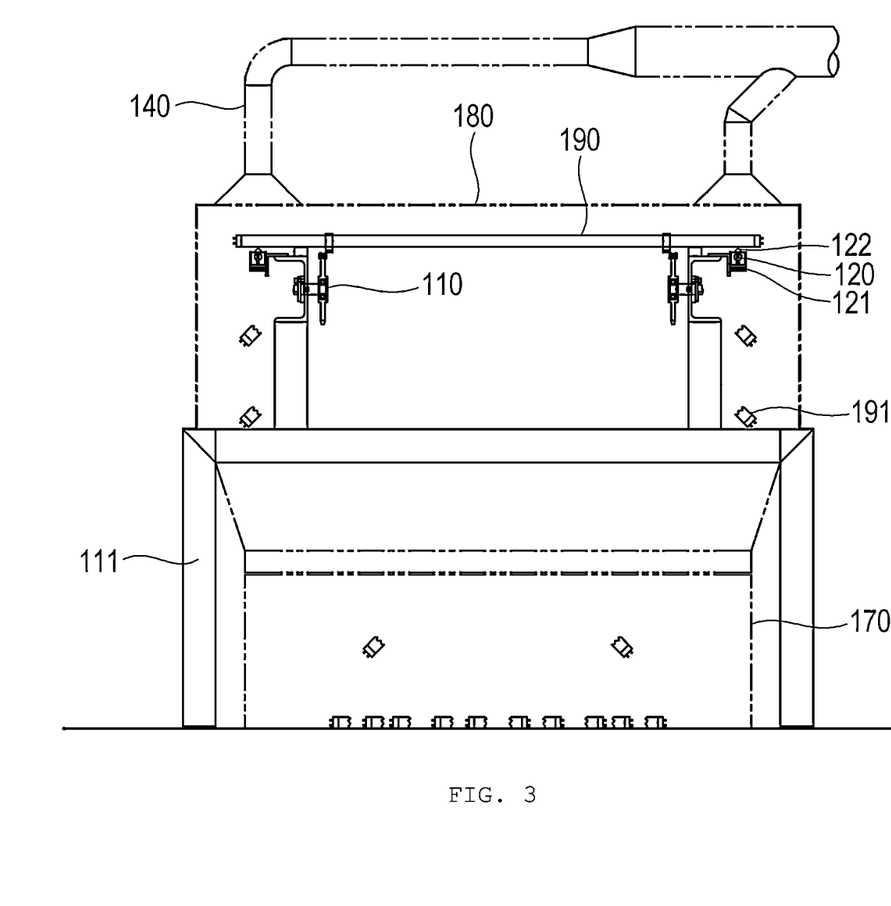
FIG. 3 is a front view of the end-cutting device for the waste fluorescent light according to the present invention.

FIG. 1 is a plan view of an end-cutting device for a waste fluorescent light according to the present invention, FIG. 2 is a side view of the end-cutting device for the waste fluorescent light according to the present invention, and FIG. 3 is a front view of the end-cutting device for the waste fluorescent light according to the present invention.

Referring to FIGS. 1 to 3, a waste fluorescent light end-cutting device 100 according to the present invention includes a conveyor 110, heating wires 120, cooling wires 130, and a suction duct 140.

Firstly, the conveyor 110 is configured to transfer a waste fluorescent light 190 and is properly disposed on a support 111. In the present invention, all kinds of known conveyors such as screw type, belt type, and chain type conveyors may be used as the conveyor 110. The conveyor 110 is not specifically limited in type if the waste fluorescent light 190 is transferred at regular intervals and speeds therethrough.

Then, the heating wires 120 are configured to heat the waste fluorescent light 190. The heating wires 120 are disposed on both sides of the conveyor 110 to match cutoff portions. In detail, heat-insulation blocks 121 are disposed on both sides of the conveyor 110. The heating wires 120 are inserted into the heat-insulation blocks, respectively.

In this case, the waste fluorescent light end-cutting device may further include a cutting knife 122 connected to each of the heating wires 120 and disposed on each of the heat-insulation blocks 121 so as to prevent the heating wire 120 from being damaged by directly contacting the waste fluorescent light 190. According to this structure, heat generated from the heating wire 120 may be indirectly transmitted to the waste fluorescent light 190 to prevent the heating wire 120 from directly contacting the waste fluorescent light 190, thereby improving durability of the heating wire 120.

Alternatively, the heating wire 120 may be disposed within a pipe (not shown) and then disposed on the heat-insulation block 121. Like this, if the heating wire 120 avoids the direct contact with the waste fluorescent light 190, the heating wire 120 is not specifically limited in installation method.

The heating wire 120 may be preferably constituted by a preheating part and a heating part. This is because, when the waste fluorescent light 190 is heated at a high temperature from the beginning, the waste fluorescent light 190 may be broken due to a sudden temperature change.

Then, the cooling wire 130 is configured to generate a temperature difference in the heated waste fluorescent light 190 and thus apply thermal shock, thereby cutting a base cap 191. The cooling wire 130 is subsequently disposed on a rear end of the heating wire 120. In the present invention, tube type refrigerant may be used as the cooling wire 130. In this case, a temperature difference between the cooling wire 130 and the heating wire 120 may be below about 600° C. This is because, when the temperature difference between the heating wire 120 and the cooling wire 130 exceeds about 600° C., the waste fluorescent light 190 may be broken due to excessive thermal shock. For example, when the heating wire 120 has a temperature of about 600° C. to about 700° C., it is preferable that the cooling wire 130 has a temperature of about 20° C. Like this, according to the present invention, since the base cap 191 is cut by using the appropriate thermal shock due to the temperature difference between the heating wire 120 and the cooling wire 130, a glass tube may be accurately rapidly separated at a temperature that is significantly less than that at which glass is completely molten to be separated.

In this case, the base cap 191 separated due to the thermal shock drops into a collection box 170 disposed under a boundary portion between the heating wire 120 and the cooling wire 130 and is transferred to a 2-way diverter.

Lastly, the suction duct 140 is configured to suction and remove various harmful gases generated while the base cap 191 is cut due to the thermal shock. The suction duct 140 is disposed above the conveyor 110 between the heating wire 120 and the cooling wire 130.

In the present invention, the suction duct 140 may operates by a sensor (not shown). In detail, the sensor is disposed between the heating wire 120 and the cooling wire 130 to detect the waste fluorescent light 190 at the moment at which the waste fluorescent light 190 passes through a cutting position, i.e., between the heating wire 120 and the cooling wire 130, thereby operating the suction duct 140. In this structure, since the suction duct 140 operates only in case of necessity, power consumption may be minimized.

Meanwhile, the waste fluorescent light end-cutting device according to the present invention may further include a cyclone (not shown). The cyclone is configured to collect a fluorescent material generated while the base cap 191 is cut as described above. The cyclone is properly disposed at one side of the conveyor 110. In the present invention, a non-treated mercury gas is transferred to an activated carbon gas collector and then is treated.

Also, the waste fluorescent light end-cutting device according to the present invention may further include a hood 180. The hood 180 is configured to collect various harmful gases containing the mercury gas and dusts, which are generated during the end-cutting process and the fluorescent material removing process. The hood 180 is disposed over an entire region of an upper portion of the waste fluorescent light end-cutting device 100. Thus, the gas materials collected through the hood 180 are transferred to an adsorption tower and are treated.

Meanwhile, although only a straight tube-type fluorescent light is exemplified for convenience of description, the present invention is not limited thereto. For example, it may be understood that the present invention is applicable to circular fluorescent lights or other fluorescent lights having various sizes through a simple design change. For example, like the circular fluorescent lights, when a glass tube is rounded, and a cutoff portion is disposed inside in a fluorescent light, the heating wire 120 and the cooling wire 130 may be disposed on the cutoff portion in a state where a width between the heating wire 120 and the cooling wire 130 is narrowed. Therefore, the waste fluorescent light end-cutting device 100 may cut the base cap 191 to separate the fluorescent material from the circular fluorescent light, like the straight tube-type fluorescent light.

Also, the waste fluorescent light end-cutting device 100 according to the present invention may be loaded on transportations such as a five-ton truck or a box van and be freely carried to anywhere.

The structure of the waste fluorescent light end-cutting device according to the present invention has been described above. Hereinafter, an operation of the waste fluorescent light end-cutting device according to the present invention will be described in detail.

Continuously referring to FIGS. 1 to 3, firstly, the waste fluorescent lights 190 are fed at regular intervals onto the conveyor 110 and then sequentially transferred. Then, when each of the waste fluorescent lights 190 reaches the heating wire 130, the heating wire 130 is preheated to heat the waste fluorescent lights at a temperature of about 600° C. to about 700° C. When the waste fluorescent light 190 passes through the cooling wire 140 in the heated state, the base cap 191 is cut by thermal shock due to a temperature difference. Here, various harmful gases generated through this process may be removed by the suction duct 140. Meanwhile, the cut base cap 191 may be collected into the collection box 170 and subsequently treated. A fluorescent tube 192 having both opened ends that is formed by cutting the base caps 191 may be continuously transferred for the next process. Here, the fluorescent material remaining in the fluorescent tube 192 may be removed by the cyclone 160. A glass tube in which the fluorescent material is removed may be transferred to a secondary crusher and be crushed into a size of about 6 mm.

The operation of the waste fluorescent light end-cutting device according to the present invention has been described above. Hereinafter, preferred embodiments of the present invention will be described. The following preferred embodiments should be considered in descriptive sense only and not for purposes of limitation.

Embodiment

Figure 4:
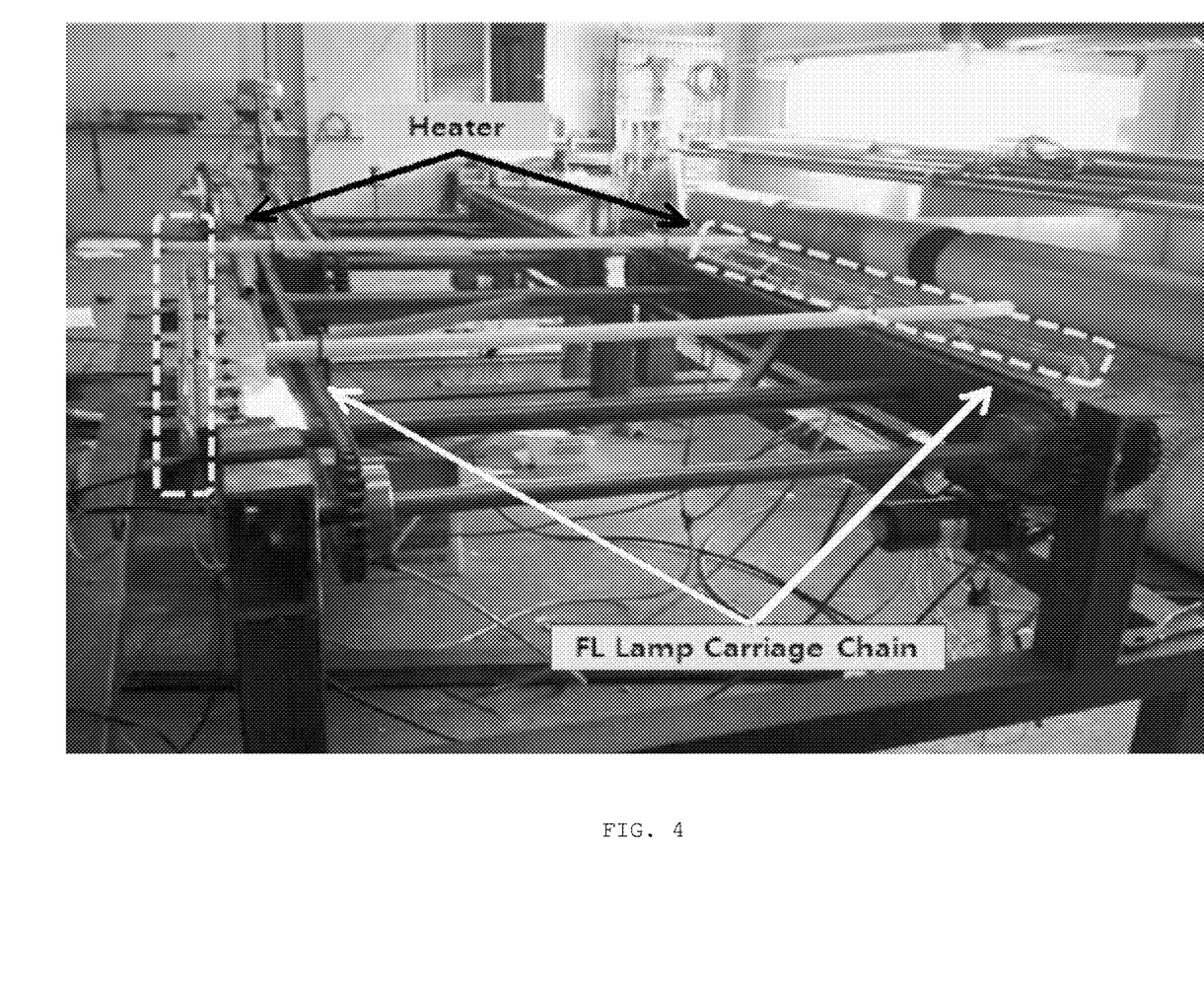
FIGS. 4 and 5 are photographs showing a state where the end-cutting device for the waste fluorescent light is installed according to an embodiment of the present invention.
Figure 5:
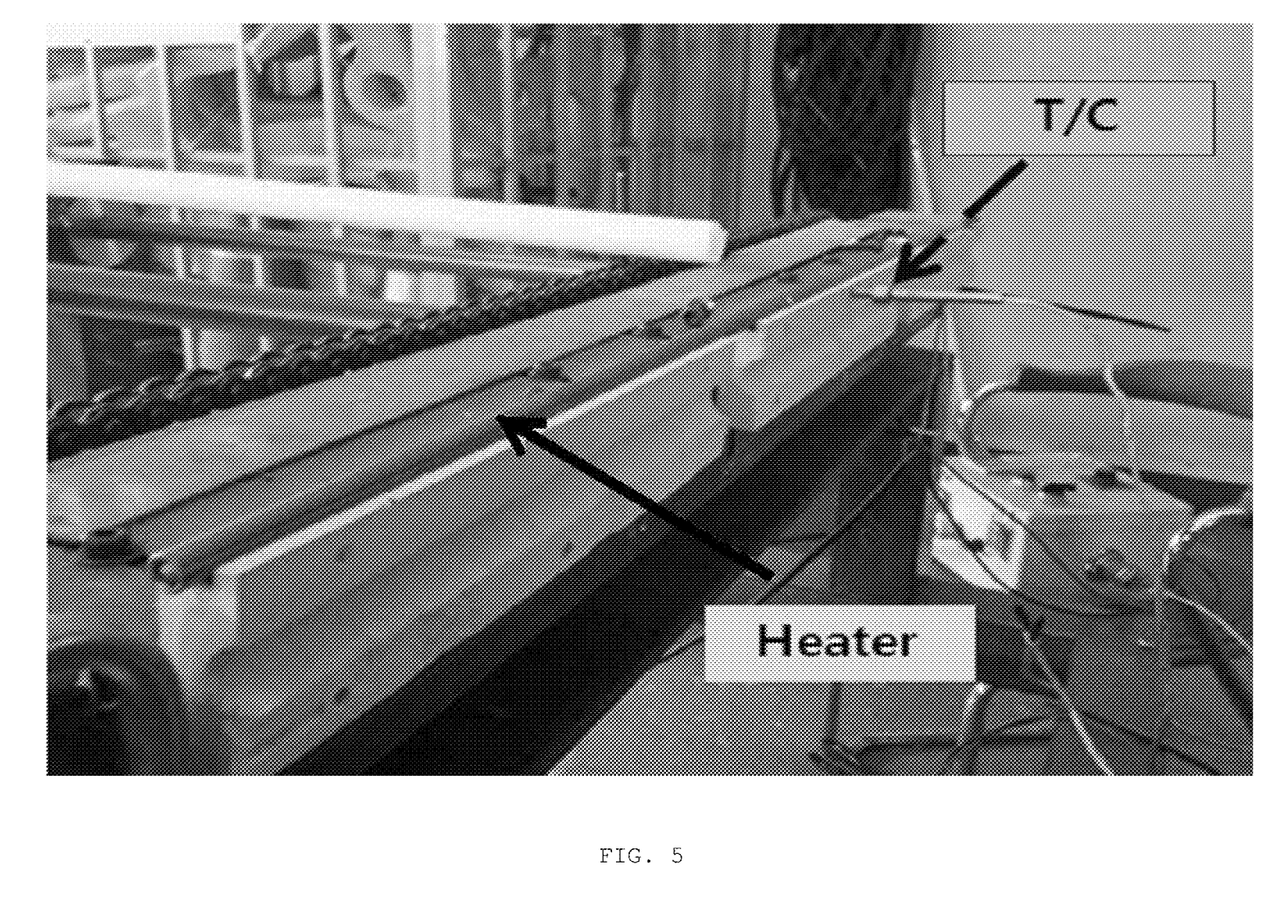

As illustrated in FIGS. 4 and 5, after the waste fluorescent light end-cutting device is manufactured according to the present invention, 40W straight tube-type fluorescent lights were randomly selected from five companies for experiments. Here, standards of the fluorescent lights used in the experiments are shown in Table 1.

TABLE 1

| Types | Code | Wattage (W) | Diameter (mm) | Length (mm) | Mass (g) | Base |
|---|---|---|---|---|---|---|
| A | FHF32SSY | 32 | 26 | 1198 | 189.9 | G-13 |
| B | FHF32SSEX-D | 32 | 26 | 1198 | 189.9 | G-13 |

TABLE 1-continued

| Types | Code | Wattage (W) | Diameter (mm) | Length (mm) | Mass (g) | Base |
|---|---|---|---|---|---|---|
| C | FLR32SSEX-D/A | 32 | 26 | 1198 | 182.3 | G-13 |
| D | FHF32SSEX-D/A | 32 | 26 | 1198 | 188.0 | G-13 |
| E | FHF32SSEX-D | 32 | 26 | 1198 | 162.7 | G-13 |

Figure 6:
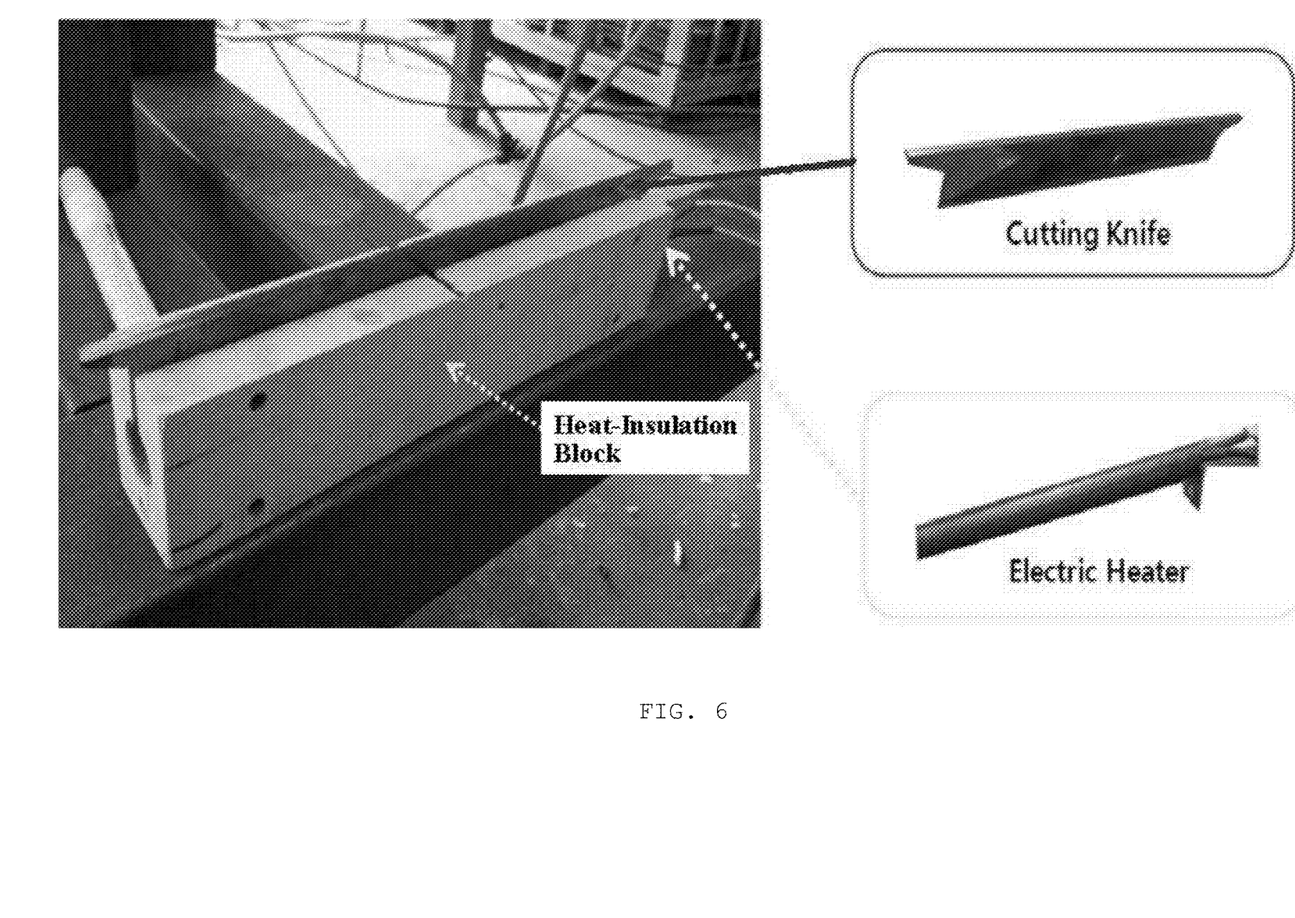
FIG. 6 is a photograph showing a state where the end-cutting device for the waste fluorescent light according to Experiment 1 of an embodiment of the present invention.
Figure 7:
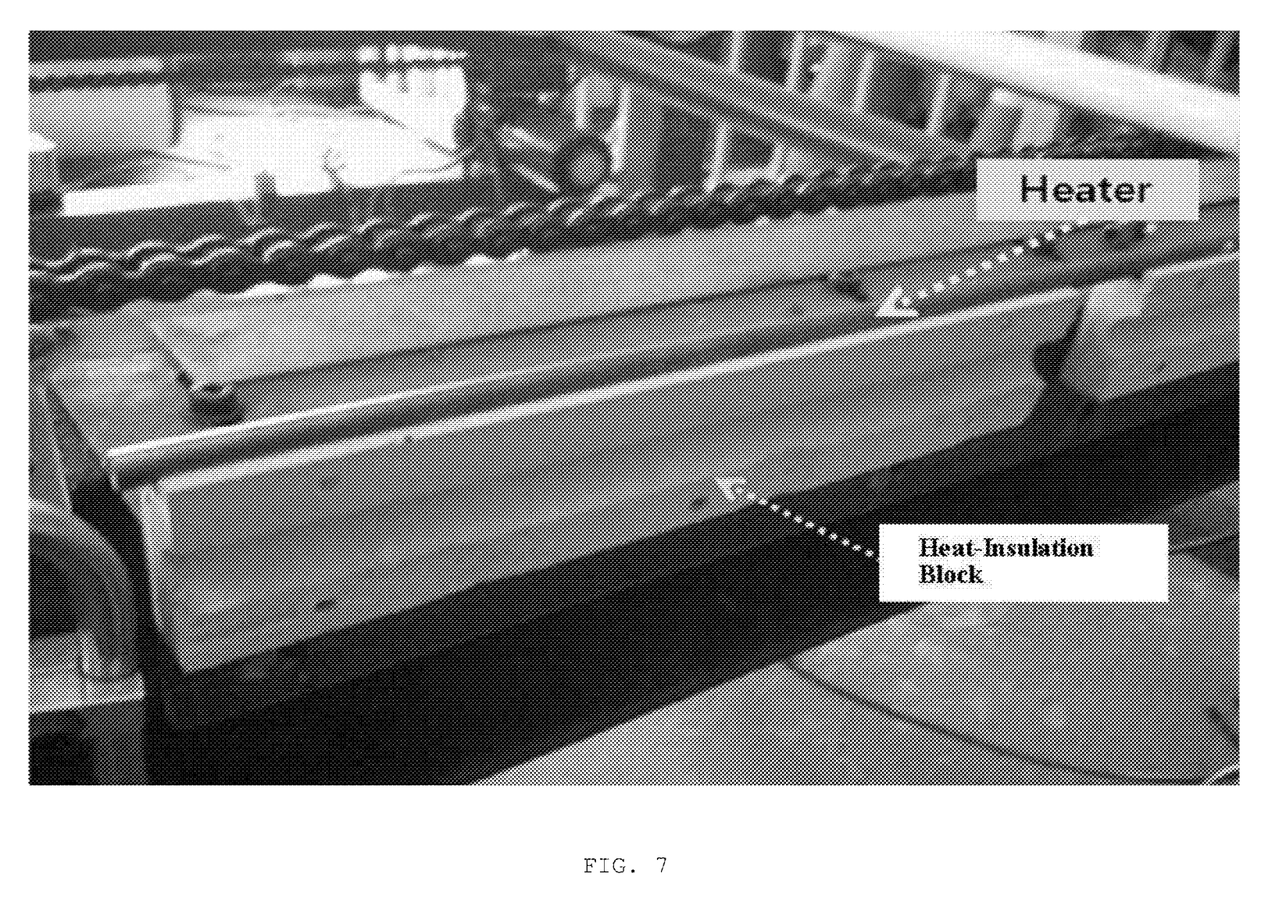
FIG. 7 is a photograph showing a state where the end-cutting device for the waste fluorescent light according to Experiment 2 of an embodiment of the present invention.

In a first experiment, as shown in the photograph of FIG. 6, the heating wire was inserted into the heat-insulation block, and the cutting knife was disposed on the heating wire. Here, three heating unit each of which has a length of about 25 cm were provided on each of both sides, and thus total six heating units were installed to conduct the experiment. Also, in a second experiment, as shown in photograph of FIG. 7, a linear heating wire having a length of about 70 cm was disposed on each of both sides, and thus total two heating wires were installed to conduct the experiment. That is, the first experiment is an indirect contact-type cutting method using the cutting knife, and the second experiment is a direct contact-type cutting method in which the heating wire is directly in contact with the fluorescent light.

In detail, the first experiment was conducted while the temperature of the heating wire is changed from about 450° C. to about 850° C., and a moving speed of the fluorescent light is changed from about 0.1 m/s to about 0.5 m/s. As a result, it is seen that, when the base cap is separated at the temperature of about 850° C. and the speed of about 0.1 m/s, the base cap is not smoothly separated.

Also, the experiment was conducted while the temperature difference between the heating wire and the cooling wire is changed from about 250° C. to about 650° C., and the moving speed of the fluorescent light is changed from about 0.1 m/s to about 0.5 m/s. In this case, it was examined whether the base cap is separated according to the moving speed of the fluorescent light in a state where the heating wire is maintained at a temperature of about 555° C., and the cooling wire is maintained at a temperature of about 5° C. The results obtained through the above-described experiment are shown in Table 2.

TABLE 2

| Experimental factors | Heating Unit | | | | |
|---|---|---|---|---|---|
| Temperature Difference [° C.] | 550 | 550 | 550 | 550 | 550 |
| Speed [m/s] | 0.1 | 0.2 | 0.3 | 0.4 | 0.5 |
| Result | Pass | Poor | Fail | Fail | Fail |

As shown in Table 2, the base cap was smoothly separated only when the moving speed of the fluorescent light was about 0.1 m/s, but was not separated at a moving speed of about 0.1 m/s or more. Thus, it is seen that, if the temperature difference between the heating wire and the cooling wire is about 550° C., the base cap is accurately separated only when the moving speed of the fluorescent light is low.

Furthermore, it was examined whether the base cap is separated while the heating wire is changed in temperature in a state where the cooling wire is maintained at a temperature of about 5° C., and the fluorescent light was maintained at a moving speed of about 0.1 m/s. The results obtained through the above-described experiment are shown in Table 3.

TABLE 3

| Experimental factors | Heating Unit | | | | |
|---|---|---|---|---|---|
| Temperature Difference [° C.] | 250 | 350 | 450 | 550 | 650 |
| Speed [m/s] | 0.1 | 0.1 | 0.1 | 0.1 | 0.1 |
| Result | Fail | Fail | Fail | Pass | Pass |

As shown in Table 3, it is seen that the base cap is smoothly separated only when the temperature difference between the heating wire and the cooling wire is about 550° C. or more. Thus, it can be noted that the base cap may be separated when the temperature difference between the heating wire and the cooling wire is large even though the moving speed of the fluorescent light increases.

Figure 8:
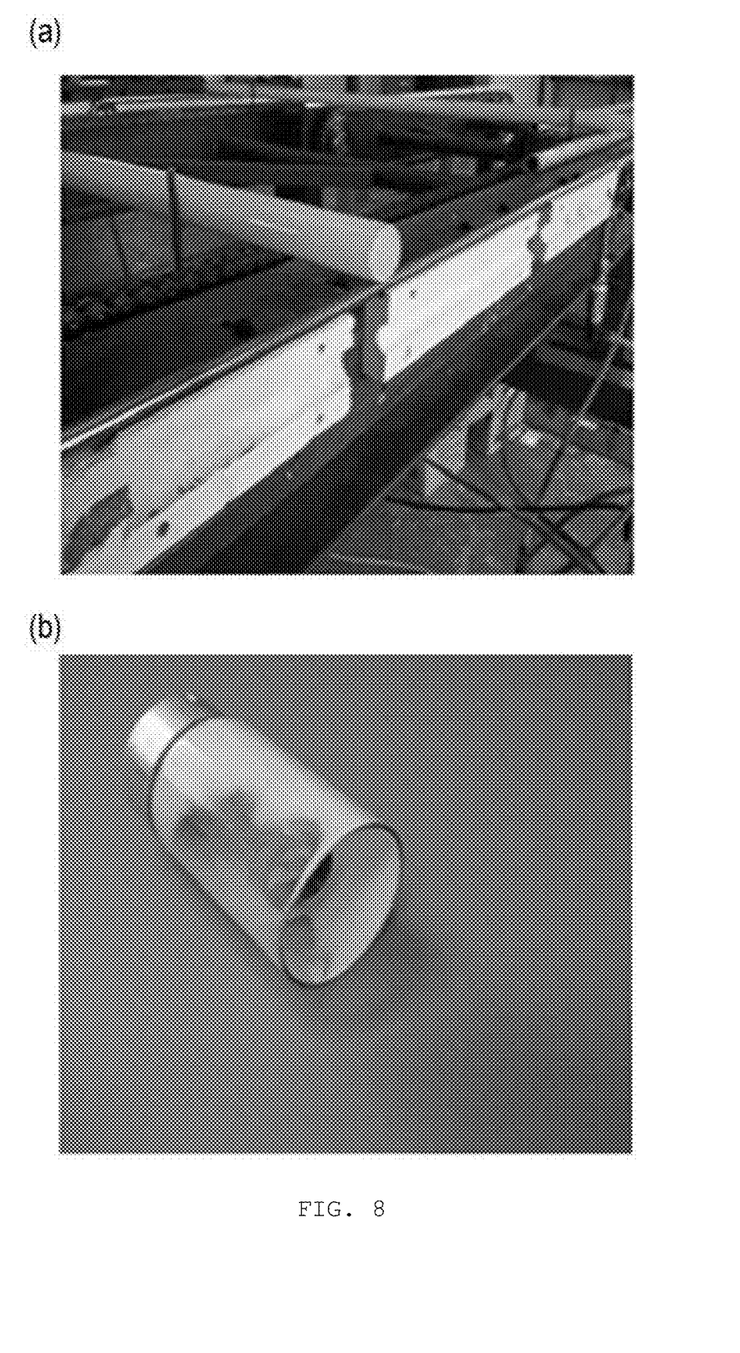
FIG. 8 is a photograph showing the cut fluorescent light and base cap according to an embodiment of the present invention.

For reference, the fluorescent light and the base cap, which are separated from each other, are shown in the photograph of FIG. 8. Referring to this photograph, it can be noted that when the thermal shock according to the present invention is applied, the base cap is accurately cut without generating fragments of glass.

The exemplary embodiments of the present invention were described in detail with reference to the accompanying drawings. The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A waste fluorescent light end-cutting device comprising:
   a conveyor configured to transfer a waste fluorescent light;
   heat-insulation blocks each disposed on each side of the conveyor along a longitudinal direction of the conveyor;
   a heating wire inserted into each heat-insulation block;
   a cutting knife installed at the each heat-insulation block and including:
      a lower portion connected with the heating wire inserted into the each heat-insulation block, and
      a blade exposed above the each heat-insulation block and configured to contact with and heat a base cap of the waste fluorescent light being transferred by the conveyor;
   a cooling tube disposed on a rear side of each heat-insulation block and configured to cool the base cap heated by the blade such that the base cap is separated from the waste fluorescent light by a temperature difference between the heating wire and the cooling tube; and
   a suction duct disposed above the conveyor between the cooling tube and the heating wire.

2. The waste fluorescent light end-cutting device of claim 1, wherein the temperature difference between the heating wire and the cooling tube is below about 600° C.

* * * * *